July 17, 1934.  W. H. PRATT  1,967,100
TELEMETERING SYSTEM
Filed Oct. 4, 1929
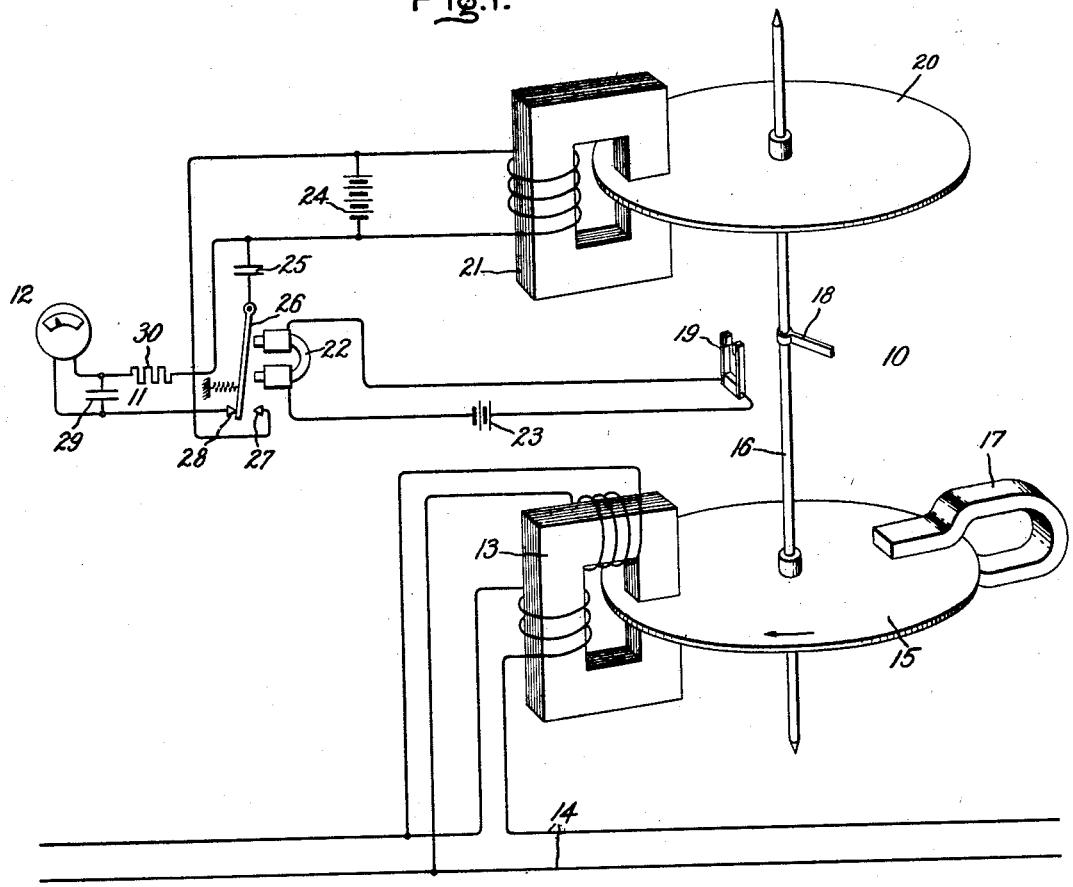
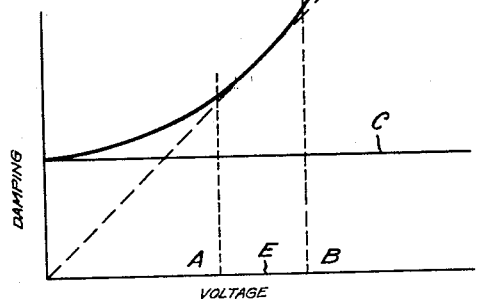
Inventor:
William H Pratt,
by Charles E. Mullen
His Attorney.

Patented July 17, 1934

1,967,100

UNITED STATES PATENT OFFICE 1,967,100

TELEMETERING SYSTEM

William H. Pratt, Lynn, Mass., assignor to General Electric Company, a corporation of New York Application October 4, 1929, Serial No. 397,430

10 Claims. (Cl. 177—351)

My invention relates to an electric telemetering system and apparatus of the electric impulse type where the magnitude of the transmitted measurement varies with the impulse rate. The main object of my invention is to compensate such systems for voltage variations in the source supplying the electrical impulses.

In a system of this character the receiver may comprise an electric measuring instrument suitably arranged to measure the average impulse current. If the impulse rate is exactly proportional to the measurement which is being transmitted the quantity of current per impulse should be constant and this requires a constant voltage source for the impulses which is not always feasible or economical.

It is apparent that if the source supplying the impulses varies in voltage the quantity of electricity transmitted per impulse will not remain constant but will increase and decrease with the voltage. If then the impulse rate is exactly proportional to the measurement which it is desired to transmit the receiving instrument will be in error by an amount dependent upon the error in voltage. In other words the quantity of electricity measured by the receiving instrument will not be exactly proportional to the measurement which it is desired to transmit.

In accordance with my invention I correct for the voltage variation by causing the impulse rate to vary from the true rate by an amount and in a direction necessary to supply the receiving instrument with a quantity of electricity exactly proportional to the measurement which it is desired to transmit regardless of voltage variations in the source from which the impulses are supplied. Thus, if the impulse voltage is high the impulse rate is slowed down and when the impulse voltage is low the impulse rate is increased. This corrective variation in the impulse rate is easily made at the impulse transmitter, preferably by employing an electromagnet damper energized from the same source supplying the impulses.

The features of my invention which are believed to be novel and patentable will be pointed out in the claims appended hereto. For a better understanding of my invention reference is made in the following description to the accompanying drawing which represents in Fig. 1 a diagrammatic layout of an impulse telemetering system to which my invention is applied; and Fig. 2 represents curves showing the relation between the variable voltage and the amount of variable damping required for an integrating meter element employed as an impulse transmitter.

In Fig. 1 an integrating type watt hour meter element 10 serves as an impulse transmitter for sending impulses over a system 11 to a distant receiver 12. The watthour meter element comprises the usual electromagnet system 13 connected to a line 14 to produce a torque flux proportional to watts in the armature disc 15 mounted for rotation with a shaft 16. A permanent magnet damping magnet for the induction disc 15 is represented at 17. 18 represents a contact closer arm mounted on and rotated with shaft 16. This arm cooperates with some suitable form of contact device represented at 19 to close a circuit and transmit impulses at a rate proportional to the rate of rotation of shaft 16.

Mounted on shaft 16 is an additional disc 20 cooperating with an electromagnet 21 to form an electromagnetic induction disc damper for the transmitting instrument. Usually the contact device represented at 19 is made delicate so as to be easily closed without interfering with the metering accuracy of the integrating meter element and it is generally desirable to provide a control relay such as is shown at 22 for operating a more rugged contacting device. A source indicated at 23 supplies the relay circuit controlled by the meter operated contact 19. The source of supply for the telemetering circuit 11 which may be several miles in length is indicated at 24. This may be a storage battery, a direct current lighting circuit or it may comprise a rectifier supplied from some convenient alternating current circuit. This source does not need to be a constant voltage source but may and is presumed to vary somewhat from a given value.

In order to be sure that the transmitted impulses will always be of the proper value I prefer to have the relay 22 function to charge a condenser 25 from the source 24 and discharge it over the telemetering circuit 11 to the distant receiver 12. This eliminates any error that might be caused by irregularities in the action of the meter actuated contact at 19, such for example, as contact closures of different duration. Accordingly, the armature 26 of relay 22 is connected through condenser 25 to one side of source 24 and cooperates with two contacts 27 and 28, contact 28 being connected to the other side of source 24 and contact 27 being connected to one side of the telemetering circuit 11. The other side of the telemetering circuit is connected to the source 24 on the same side with condenser 25. The condenser 29 shown connected across the telemetering circuit is preferably employed. It assists in smoothing out the current impulses supplied to the receiving instrument 12 and protects the system against excessive static voltages. The resistance 30 in the telemetering circuit is used for calibrating and protecting purposes. The receiving instrument 12 is an electric measuring instrument suitably damped and calibrated with the system to produce an indication proportional to the average impulse current.

The operation of the impulse apparatus is caused by the intermittent closure of contacts 19 as the arm 18 is rotated past this point. Closure of contacts 19 energizes relay 22. Its armature 26 normally forced against contact 28 is attracted and makes contact with 27. The condenser 25 then receives a charge from source 24, which charge is proportional to the voltage of 24. As soon as contacts 19 are opened armature 26 returns to contact 28 and the charge of condenser 25 is discharged over the telemetering circuit and flows through instrument 12. This operation is repeated at a rate depending upon the rate of operation of the transmitter and the instrument 12 averages the current impulses and produces a steady indication.

If now the rate of rotation of the transmitter is exactly proportional to the measurement of the watthour meter element and the voltage of source 24 remains constant the instrument 12 will receive equal current impulses at a rate dependent upon the measurement and will produce an indication corresponding to the measurement. However, if the voltage of source 24 varies, the current impulses will not be of equal magnitude and an erroneous indication will be produced unless the impulse rate is altered from the true rate by a corresponding amount and in the proper direction such that the average impulse current remains proportional to the true measurement.

In accordance with my invention the rate of rotation of the transmitter is caused to vary slightly from the true measurement rate as the voltage of source 24 changes to the extent necessary to cause the average current received at 12 to be exactly proportional to the measurement which actuates the transmitter. To this end a portion of the damping of the transmitter is supplied by the electromagnet 21 which is energized by source 24 and this portion of the damping will therefore vary with the voltage of source 24 and with the magnitude of the current impulses. This will cause the rate of rotation of the transmitter to vary from its true measurement rate, making it slow when the voltage of source 24 is high and making it fast when the voltage of source 24 is low. It is known that the damping produced by an electromagnet disc damper of the character shown varies with the square of the applied voltage, whereas the magnitude of the current impulses supplied from a given source in the manner explained varies with the first power of the source.

In Fig. 2 I may represent the constant damping of the transmitter produced by the permanent magnet 17 by the horizontal line C and the variable damping produced by electromagnet 21 by the parabolic curve V measured from the line C, the ordinates of the curve representing damping and the abscissa representing voltage of source 24. The dotted line I may represent the values of the current impulses which increase as the first power of the voltage. Now it will be seen that over a range of voltage between A and B the total damping of the transmitter is substantially truly proportional to the voltage of source 24 or to the current impulse value. It will therefore be seen that if the source 24 has an average value E and does not vary beyond the limits A B and the relation between the constant and variable damping is as represented the results sought after will be accomplished. This relation holds for any measurement speed of the transmitter because the damping, whether produced by a permanent magnet or an electromagnet, is proportional to the speed of the damping disc. In this way it is possible to obtain a transmitter speed and impulse rate that is proportional to the $$\frac{\text{true measurement}}{\text{current impulse value}}$$

over an appreciable range of variation in the voltage of the impulse source and thus to obtain accurate indications at 12 of the true measurement regardless of ordinary variations in such voltage.

In Fig. 2 the average value of the variable damping is made about equal in value to the constant damping. This relation is not essential but appears to give better results than an arrangement where the two damping devices are made greatly unequal. Other ways of varying the speed of the transmitter in inverse relation to the impulse voltage source will occur to those familiar with metering problems and I do not wish to confine my invention to the particular arrangement here used to illustrate the invention. Obviously the transmitter does not necessarily need to be an electric meter.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. A telemetering system comprising a transmitter for transmitting electric current impulses at a rate proportional to a measurement, a receiver comprising an electrical measuring instrument actuated in accordance with the average impulse current and sensitive to voltage variations in the impulse source, a source from which such impulses are supplied, circuit connections between said source, transmitter and receiver, and means responsive to voltage variations in said source for altering the impulse rate of said transmitter to compensate for the effect of such voltage variations on the receiver.

2. An electric current impulse telemetering system, a receiver comprising an electric measuring instrument actuated in accordance with the average impulse current, a source of supply, and a transmitter connected with said source and receiver for transmitting current impulses at a rate proportional to a measurement and inversely proportional to variations in the voltage of said source.

3. A telemetering system comprising an electric current impulse transmitter operating at a rate proportional to the measurement, a receiver comprising an electrical measuring instrument actuated in accordance with the average impulse current, circuit connections between said transmitter and receiver, a source for supplying current impulses, and means responsive to voltage variations in said source for causing the rate of the transmitted impulses to vary inversely proportional to such voltage variations.

4. In an impulse current telemetering system wherein the impulse rate varies in accordance with the desired transmitted measurement, the method of compensating for voltage variations in the source supplying such impulses which consists in altering the impulse rate in inverse relation to the variation in voltage of such source.

5. A telemetering system comprising an electric measuring instrument receiver, a direct current source of supply, a condenser, associated circuit connections, a transmitter for controlling said circuit connections to alternately charge said condenser from said source and discharge it through said measuring instrument at a rate which varies with a measurement which it is desired to transmit, the receiver being sensitive to variations in the voltage of said source, and means responsive to variations in the voltage of said source of supply for altering the rate of operation of said transmitter to compensate for the effect of such voltage variations on said receiver.

6. In a telemetering system, a transmitter comprising an integrating meter element, electric impulse current controlling contacts actuated in accordance with the rate of operation of said meter element, a source of supply for the impulse current and an electromagnet damper for said meter element supplied from said source.

7. In a telemetering system, a transmitter comprising an integrating meter element, a condenser, a direct current source of supply, a transmitting circuit, means controlled in accordance with the rate of operation of said meter element for alternately charging said condenser from said source, and discharging it over said transmitting circuit, and an electromagnet damper for said meter element supplied from said source for causing the rate of operation of said meter element to vary inversely with the voltage of said source.

8. In a telemetering system, an electric impulse transmitter comprising an integrating meter element for transmitting impulses at a rate proportional to the rate of operation of such meter element, said meter element being provided with two damping devices one of which produces a constant damping and the other of which includes an electromagnet for producing a damping which varies with the square of the voltage of its source of supply, and a common source of supply for said electromagnet and for the electric current impulses transmitted by said transmitter the relative effects of the two damping devices being proportioned over the operating range of voltage of said source to so control the operation of said transmitter that it will compensate for the effect of voltage variations of said source on the magnitude of the impulses transmitted.

9. In a telemetering system, an electric impulse transmitter comprising an integrating meter element for transmitting current impulses at a rate proportional to the rate of operation of such meter element, said meter element being provided with a permanent magnet induction disc damper and an electromagnet induction disc damper each supplying approximately half of the total damping of the meter element under normal conditions, and a common source of supply for said electromagnet damper and for the electric current impulses transmitted by said transmitter.

10. In a telemetering system of the electric current impulse type, a transmitter comprising an integrating meter, contacts actuated in accordance with the rate of operation of said meter element for transmitting electric current impulses, a source of supply for said current impulses, and damping means for said meter element controlled in response to variations in said source of supply to cause the rate of operation of said transmitter to vary inversely with the voltage of said source.

WILLIAM H. PRATT.